United States Patent [19]

Guimbretiere

[11] Patent Number: 5,165,506
[45] Date of Patent: Nov. 24, 1992

[54] DYNAMICALLY VARIABLE MULTI-DISC ROTARY SHOCK ABSORBER WITH VISCOUS FLUID

[75] Inventor: Pierre Guimbretiere, Neauphle le Chateau, France

[73] Assignee: Glaenzer Spicer, Poissy, France

[21] Appl. No.: 662,252

[22] Filed: Feb. 28, 1991

[30] Foreign Application Priority Data

Mar. 9, 1990 [FR] France ................. 90 03052
Jun. 25, 1990 [FR] France ................. 90 07943

[51] Int. Cl.⁵ ............................. F16D 57/00
[52] U.S. Cl. ..................... 188/290; 188/271; 192/58 C
[58] Field of Search ............... 188/290, 271; 192/58 C

[56] References Cited

U.S. PATENT DOCUMENTS

| | | | |
|---|---|---|---|
| 1,787,602 | 1/1931 | Sweet | 188/290 |
| 2,313,132 | 3/1943 | Elliot | 192/58 C |
| 2,714,946 | 8/1955 | Tenot et al. | 192/58 C |
| 3,651,903 | 3/1972 | Butler et al. | 188/290 |
| 4,683,997 | 8/1987 | Stockmar et al. | 192/58 C |
| 4,850,246 | 7/1989 | Lanzer | 188/290 |
| 4,938,322 | 7/1990 | Sugasawara | 188/290 |
| 5,016,742 | 5/1991 | Peier | 192/58 C |

FOREIGN PATENT DOCUMENTS

| | | |
|---|---|---|
| 0025425 | 8/1980 | European Pat. Off. |
| 0654017 | 11/1937 | Fed. Rep. of Germany |
| 63-308239 | 12/1988 | Japan |
| 1-131348 | 5/1989 | Japan |
| 0401065 | 7/1932 | United Kingdom |
| 1256947 | 12/1971 | United Kingdom |

Primary Examiner—Joseph F. Peters, Jr.
Assistant Examiner—Christopher P. Ellis
Attorney, Agent, or Firm—Harness, Dickey & Pierce

[57] ABSTRACT

The invention provides a rotary shock absorber (10) of the type comprising a sealed hollow cylindrical housing (12) in which are arranged discs (50A, 50B) alternately integral in terms of rotation with the housing (12) or with a coaxial central shaft (22) mounted rotatably in the housing (12), the inner chamber (20) delimited by the housing (12) being filled at least partially with a viscous fluid received between the mutually confronting faces of the discs, characterized in that it comprises a displacement member (58) for varying the law of damping of the shock absorber as a function of the relative angular displacement of the central shaft (22) in relation to the housing (12).

24 Claims, 3 Drawing Sheets

DYNAMICALLY VARIABLE MULTI-DISC ROTARY SHOCK ABSORBER WITH VISCOUS FLUID

The present invention relates to a rotary shock absorber. It relates more particularly to a shock absorber of this type used in the design of motor vehicles.

Rotary shock absorbers working by dry friction or with vanes for damping the movements of vehicle suspensions have been used from the outset, especially when the suspensions were of the leaf-spring type. For this purpose, the vertical movement of the wheel relative to the vehicle body was converted by means of a lever system into an oscillatory rotation which was applied to the shock absorber.

These shock absorbers have since generally been replaced by hydraulic and/or pneumatic telescopic shock absorbers which work either vertically, as in MacPherson suspensions, or horizontally or in an inclined direction, especially for rear suspensions known as the "bell-crank" type, and which make it possible to ensure the best possible roadholding qualities of the vehicles.

In fact, as regards the roadholding of the vehicle, taken in the most general meaning of the word, it is necessary for the damping rates to differ greatly, depending on whether the shock absorber is working under compression or extension (expansion).

The following values can be given as an indication:
A. In a compression/:
 a. High-performance sports vehicles:
Damping rates of the order of 5,000 M/m/sec for speeds of between 0 and 0.10 meters per second are recorded: when the speed reaches the value of 0.5 meters per second, the damping rate is of the order of one third of the preceding value.
 b. "Normal" vehicles:
Rates of the order of 2,500 N/m/sec for 0.10 meters per second and, once again, approximately one third of these rates for a speed of 0.5 meters per second are recorded.
 c. High-comfort vehicles:
The rates are of the order of 1250 N/m/sec for 0.10 meters per second and, once more, approximately one third for a speed of 0.5 meters per second.
B. In an expansion/:
In general terms, the damping rates are double those encountered under compression, at least with speeds of between 0 and 0.10 meters per second; as regards the rates for speeds of the order of 0.50 meters per second, these are of the order of half the preceding rates.

In conventional telescopic shock absorbers equipping present-day motor vehicles, these different damping rates are obtained by acting on the various valves which work in one direction or the other.

Rotary shock absorbers can be considered to advantage in the design of some suspensions other than those with leaf springs, for example in respect of traction-arm suspensions, in which it is possible to arrange a rotary shock absorber between the chassis and the end of the moving arm, or simply to mount it coaxially with the axis of articulation of the traction-arms in relation to the chassis.

However, such rotary shock absorbers must offer the possibility of achieving the kind of damping rates mentioned above.

The document FR-A-2,173,441 has already provided a rotary shock absorber consisting of a sealed hollow cylindrical body, within which is keyed, on a shaft coaxial with the longitudinal axis of the body, a cylindrical rotor consisting of a plurality of discs or cylinders, whilst the cylindrical body is divided into as many chambers as there are discs or cylinders, each of the chambers receiving a disc and being filled completely with an elastomeric viscous pasty semi-liquid material, the rheological deformation of which causes a delaying effect with a constant volume and without an internal pressure of the material, by bringing about a relative movement between the rotor and the cylindrical body. This same document also makes provision, should it be desirable for any reason to obtain an asymmetric operation of the shock absorber, as for example, with a shock absorber of a motor vehicle, for equipping the peripheral wall of at least one of the elements, for example of the rotor, with a series of asymmetric teeth. It emerges from this arrangement that the rheological deformation of the material filling the volume of each or the other.

The device described and illustrated in the document just mentioned does not, however, make it possible to obtain laws of variation of the type mentioned above.

To solve this problem, the invention provides a rotary shock absorber of the type comprising a sealed hollow cylindrical housing in which are arranged discs alternately integral in terms of rotation with the housing or with a coaxial central shaft mounted rotatably in the housing, the inner chamber delimited by the housing being filled at least partially with a viscous fluid received between the mutually confronting faces of the discs, characterised in that it comprises means for varying the law of damping of the shock absorber as a function of the relative angular displacement of the central shaft in relation to the housing.

According to other characteristics of the invention:
 the means for varying the damping law act to vary the spacing between the mutually confronting faces of the discs;
 the means for varying the spacing between the mutually confronting faces of the discs comprise a member for the axial displacement of the discs, arranged within the housing, and means for converting the said relative angular displacement into an axial displacement of the member for the displacement of the discs;
 the displacement member is integral in terms of rotation with and capable of being displaced axially relative to one of the two elements consisting of the housing and the central shaft, and it is connected to the other of the said two elements as a result of an interaction of shapes provided respectively on the displacement member and on the other of the two elements and converting the said relative angular displacement into an axial displacement of the member within the said chamber;
 the shapes comprise an external thread and a complementary internal thread which are formed respectively on the displacement member or the other of the said two elements;
 the said shapes comprise a circular camtrack connected in terms of rotation to the displacement member or to the said other element and a cam follower element connected in terms of rotation to the said other element or to the said member;
 the means for varying the law of damping act to vary the fluid pressure in the chamber;

the displacement member comprises a portion which extends axially outside the housing so as to vary the volume of the part of the displacement member received in the chamber as a function of the axial position of the displacement member in relation to the housing, in order thereby to vary the internal pressure of the fluid in the chamber;

the variation in volume is an increase in volume when the displacement member is displaced axially relative to the housing in the direction corresponding to a reduction of the spacing between the mutually confronting faces of the discs;

the variation in volume is a reduction in volume when the displacement member is displaced axially relative to the housing in the direction corresponding to a reduction of the spacing between the mutually confronting faces of the discs;

the discs are mounted axially slidably relative to the housing and to the central shaft;

the shock absorber comprises an active member which is arranged outside the housing and part of which extends axially inside the housing through an orifice made in a lateral flange of the housing, in which it is received axially slidably, and a member for the axial displacements of active member relative to the housing, the displacements of which are controlled by means for converting the relative angular displacement of the central shaft in relation to the housing into an axial displacement of the displacement member;

the displacement member is integral in terms of rotation with one of the two elements consisting of the housing and the central shaft and is capable of being displaced axially relative to one of these two elements, and it is connected to the other of the two elements as a result of an interaction of shapes provided respectively on the displacement member and on the other of the two elements and converting the relative angular displacement into an axial displacement of the displacement member;

the interacting shapes comprise an external thread and a complementary internal thread which are formed on the displacement member or on the other of the two elements;

the active member is a piston, of which the cylindrical rod is received in the orifice of the flange and of which the head arranged outside the housing interacts with the axial displacement member;

the axial displacement member is a disc, of which the face confronting the housing interacts with the opposite face of the head of the piston:

means for the elastic return of the piston in the direction corresponding to the emergence of the rod from the housing are arranged between the piston head and the opposite face of the lateral flange of the housing;

the active member is a rod which is received in the orifice of the flange and of which the free end arranged outside the housing is fastened to the axial displacement member;

the external thread is formed on the displacement member and the complementary internal thread is formed in the housing;

the external thread is formed on the central shaft and the complementary internal thread is formed on the axial displacement member; and sealing means are arranged in the wall of the orifice so as to interact with the opposite surface of the active member.

Other characteristics and advantages of the invention will emerge from a reading of the following detailed description, for the understanding of which reference will be made to the accompanying drawings in which.

Figure 1:
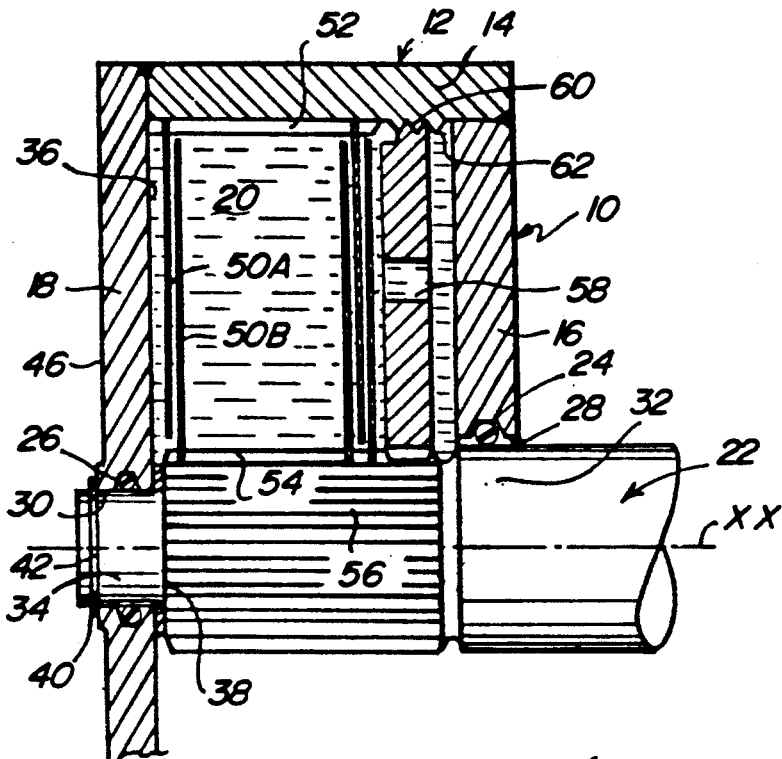
FIG. 1 is a diagrammatic half-view in axial section of the first embodiment of a shock absorber according to the teachings of the invention.

The rotary shock absorber 10 illustrated in FIG. 1 comprises a hollow cylindrical housing 12 with axis X—X, consisting of a outer cylindrical shell 14 and two lateral flanges 16 and 18 which delimit a cylindrical inner chamber 20.

The two disc-shaped lateral flanges 16 and 18 are pierced at their centre to allow the passage of a central shaft 22 coaxial with the housing 12.

The central shaft 22 is mounted freely rotatably in the housing 12, and the sealing of the chamber 20 is ensured by means of two O-ring gaskets 24 and 26 mounted in grooves formed in the cylindrical faces 28 and 30 which delimit the central bores of the flanges 16 and 18, the gaskets 24 and 26 interacting with corresponding cylindrical bearing surfaces 32 and 34 of the shaft 22.

The housing 12 is immobilised axially relative to the shaft 22 in the direction X—X as a result of the interaction of the inner face of the flange 18 with the shoulder 38 of the shaft 22 which delimits the cylindrical bearing surface 34 and against which it is held bearing by means of an elastic ring 40 mounted in a groove 42 of the cylindrical bearing surface 34 against the outer face 46 of the flange 18.

The inner chamber 20 receives a plurality of discs 50A and 50B which are pierced at their centre and which are substantially coaxial relative to the axis X—X.

The discs 50A and 50B alternate and are alternately integral in terms of rotation with the housing 12 and with the shaft 22 respectively.

Thus, the discs 50A are mounted axially slidably on axial keys 52 formed in the inner cylindrical wall of the shell 14, whilst the discs 50B are mounted axially slidably on axial keys 54 formed on the portion 56 of the shaft 22 which extends between the cylindrical bearing surfaces 32 and 34.

The shock absorber 10 also possess a member 58 for the axial displacement of the discs.

The displacement member 58 is produced in the form of a thicker disc which is mounted slidably at its centre on the axial splines 54 of the shaft 22. The outer annular cylindrical edge of the displacement disc 58 has an external thread 60 which is received in a complementary internal thread 62 formed in the inner cylindrical wall of the shell 14 on the same side as the flange 16 between the latter and the axial splines 52.

The sealed chamber 20 is filled at least partially with a viscous fluid, so that the rotary shock absorber 10 forms an assembly similar to the device known as a viscous clutch.

To perform a damping function, the two main elements 12 and 22 must, of course, be connected separately to two structural elements which are movable in rotation relative to one another and between which a damping function is to be carried out.

The rotary shock absorber just described operates as follows.

If the central shaft 22 is driven in rotation relative to the housing 12 in a first direction of rotation, it drives in rotation the discs 50B between the discs 50A and produces a conventional effect of laminar flow in the viscous fluid which generates a rotation-braking effect. The same rotation of the shaft 22 drives the displacement disc 58 in rotation by means of the splines 54 and thus brings about its axial displacement relative to the shaft 22 and to the housing 12 as a result of the interaction between the external thread 60 and the internal thread 62. According to the particular direction of the threading, the rotation in the first direction, for example, clockwise, of the shaft 22 causes the axial displacement of the displacement disc 58 in the direction corresponding to the bringing together of the discs 50A and 50B, that is to the left as seen in FIG. 1.

The effect of the first axial displacement is, therefore, to reduce the spacing between the discs 50A and 50B and thus to vary the law of damping resulting from the creating of laminar flow in the viscous fluid as a function of the angular rotational displacement of the shaft 22 relative to the housing 12.

It will easily be appreciated that the rotation of the shaft 22 relative to the housing 12 in the opposite direction, for example the anti-clockwise direction, causes the displacement of the disc 58 in the opposite axial direction corresponding to a mutual movement away of the discs 50A and 50B and therefore providing a different law of damping.

An identical result would, of course, have been obtained if the external thread 60 and the internal thread 62 had been provided on the shaft 22 and if the displacement disc 58 had been guided axially on the splines 52. As regards a use for damping the movements of a motor-vehicle suspension, it will be noted that the rotational oscillation is accompanied by a spring acting in parallel with the shock absorber.

For example, if the external thread has a pitch of 3 mm, there is an axial displacement of the disc 58 of more or less 0.3 mm for a rotational oscillation of more or less 36° and therefore, for example, a bringing together by of the order of 0.03 mm between the discs of the shock absorber when there are five pairs of alternate discs.

The other alternative embodiments of the invention, for which the same reference numerals as those of FIG. 1 will be used to designate identical or equivalent elements, will now be described.

Figure 2:
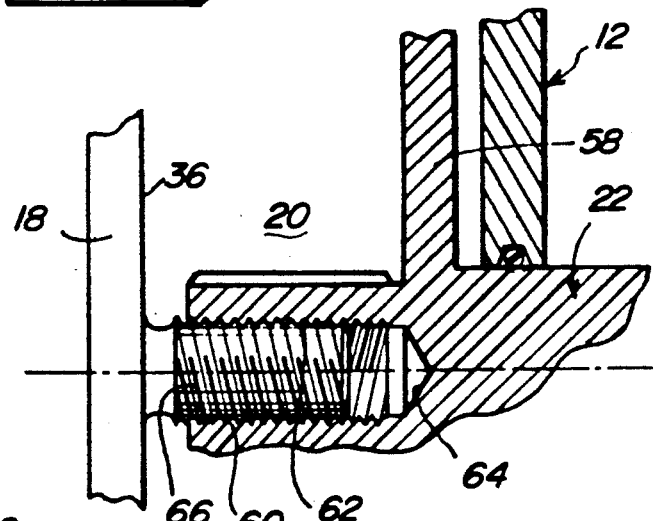
FIG. 2 is a partial view, similar to that of FIG. 1, of a first alternative embodiment.

In the alternative embodiment illustrated in FIG. 2, the displacement disc 58 forms a unit with the shaft 22, and its axial displacement within the chamber 20 is obtained by means of a threaded connected which comprises an internal thread 62 formed in a coaxial blind bore 64 of the shaft 22 and an external thread 60 formed on the outer cylindrical wall of a coaxial central finger 36 fastened to the inner face 36 of the lateral flange 18.

Discs 50A and 50B (not shown) are, of course, arranged in the chamber 20 in the same way as in FIG. 1.

The shock absorber illustrated in FIG. 2 makes it possible, on the one hand, to vary the law of damping as a function of the angle of rotation on the same principle as in FIG. 1, that is to say by varying the spacing between the discs, but it also makes it possible to vary the internal pressure within the chamber 20.

In fact, any rotational displacement of the shaft 22 in relation to the housing 12 causes a relative axial displacement of the shaft 22 within the chamber 20, and depending on whether this axial displacement takes place in one direction or the other (to the left or to the right as seen in FIG. 2) there is an increase or a reduction in the volume of the portion of the shaft 22 located inside the chamber 20 and therefore a variation of the volume available for the viscous fluid contained in the chamber 20 and consequently a variation in pressure within the latter.

Figure 3:
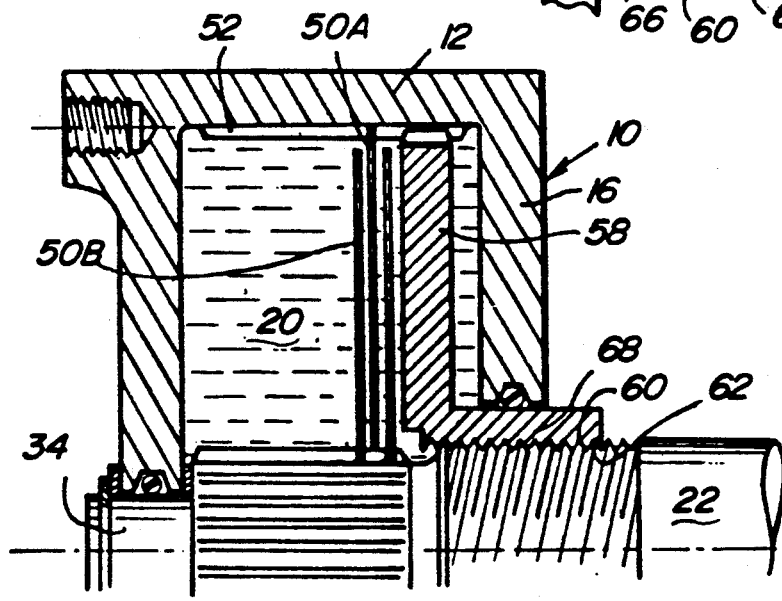
FIG. 3 is a view, similar to that of FIG. 1, of a second alternative embodiment.

In the alternative embodiment illustrated in FIG. 3, the plate or disc 58 is immobilised in terms of rotation relative to the housing 12 and is guided axially within the latter by means of the axial splines 52.

In its central part, the thrust disc 58 is extended by an axial sleeve 68 which projects from the housing 12 to the right, as seen in FIG. 3, through the central orifice formed in the flange 16 and the inner cylindrical wall of which has an internal thread 62 which interacts with an external thread 60 formed on the opposite cylindrical bearing surface of the shaft 22.

The discs 50A and 50B are arranged in the chamber 20 in the same way as in FIG. 1, and the operation of the shock absorber shown in FIG. 3 is identical to that of FIG. 2.

Thus, rotation of the shaft 22 causes an axial displacement of the disc 58 which brings the discs 50A and 50B closer together, whilst the corresponding axial penetration of the portion of the cylindrical sleeve 68 extending in the chamber 20 brings about a reduction of the volume available for the viscous fluid and an increase of the internal pressure in the chamber 20 when this axial displacement takes place from right to left as seen in FIG. 3.

It should be noted that, as in respect of FIG. 2, the two effects of bringing the discs closer together and of increasing the internal pressure are added to one another in order to increase the braking effect obtained by means of the shock absorber 10.

Figure 4:
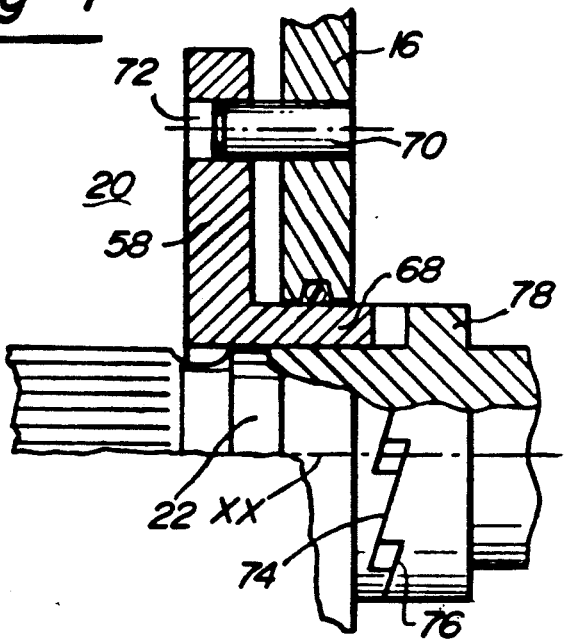
FIG. 4 is a partial view, similar to that of FIG. 1, of a third alternative embodiment.

The alternative embodiment illustrated in FIG. 4 operates on the same principle as that shown in FIG. 3, that is to say there is action both on the spacing of the discs and on the pressure within the chamber 20.

It can be seen, in fact, that the axial displacement disc 58 has a cylindrical sleeve 68 as in FIG. 3.

However, in this alternative embodiment, the thrust disc 58 is immobilised in rotation relative to the housing 12 by means of a series of studs 70 which extend parallel to the axis X—X from the flange 16 into the chamber 20 and which are received with play in drillholes 72 made opposite them in the disc 58.

The axial displacements of the disc 58 in relation to the shaft 22 are obtained by means of two circular camtracks 74 and 76 formed respectively on the portion of the cylindrical sleeve 68 located outside the housing 12 and on an outer radial shoulder 78 of the shaft 22.

As a result of the interaction between the camtracks 74 and 76, any rotation of the shaft 22 in relation to the housing 12 causes an axial displacement of the disc 58 relative to the central shaft 22.

In the embodiment illustrated in FIG. 4, the camtracks are plane, and there is a linear axial displacement of the disc as a function of the relative angle of rotation. Of course, camtracks with more complex profiles could be provided, making it possible to obtain any law of variation of the braking effects as a function of the relative angle of rotation between the shaft 22 and the housing 12.

Figure 5:
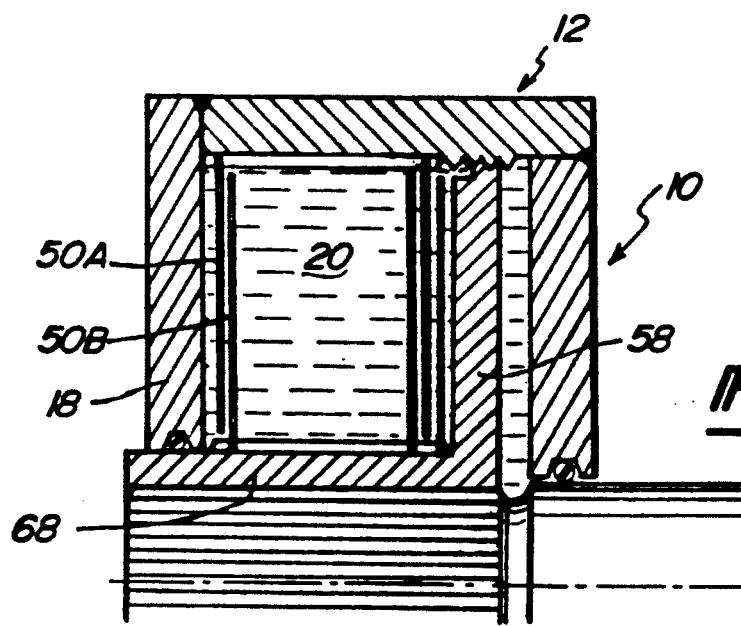
FIG. 5 is a view, similar to that of FIG. 1, of a fourth alternative embodiment of the invention.

The alternative embodiment illustrated in FIG. 5 provides a rotary shock absorber 10 which combines the characteristics of those shown in FIGS. 1 and 3, but in which the cylindrical sleeve 68 lengthening the axial displacement disc 58 extends out of the housing 12 from right to left, as seen in FIG. 5, that is to say through the central orifice of the lateral flange 18.

The result of this difference is that the effects of bringing the discs 50A and 50B closer together and of variations of the internal pressure in the chamber 20 are not added to one another, but are in opposite direction.

In fact, it can be seen that an axial displacement of the disc 58 to the left causes the discs 50A and 50B to be brought closer together, whilst at the same time bringing about a reduction of the volume of the portion of the cylindrical sleeve 68 located in the chamber 20.

The characteristic damping curve obtained by means of the rotary shock absorber according to the invention depends, of course, on the general dimensions of the device, the number of discs, the filling rate, the viscosity of the viscous fluid, the temperature, etc.

It will also be noted that, in conventional telescopic shock absorbers, the asymmetry between working under compression and working under expansion is the same, whatever the operating point along the stroke of the shock absorber and therefore, in particular, whatever the load of the vehicle. The result of this is that a small displacement superposed on a high movement is damped in an elementary manner in the same way, whatever the direction of the high movement. With the design according to the invention, the dampings are not the same for low movements superposed on high static movements (variation in the load of the vehicle) or dynamic movements (variation in the state of the road), this being as a function of the direction of these low movements.

Figure 6:
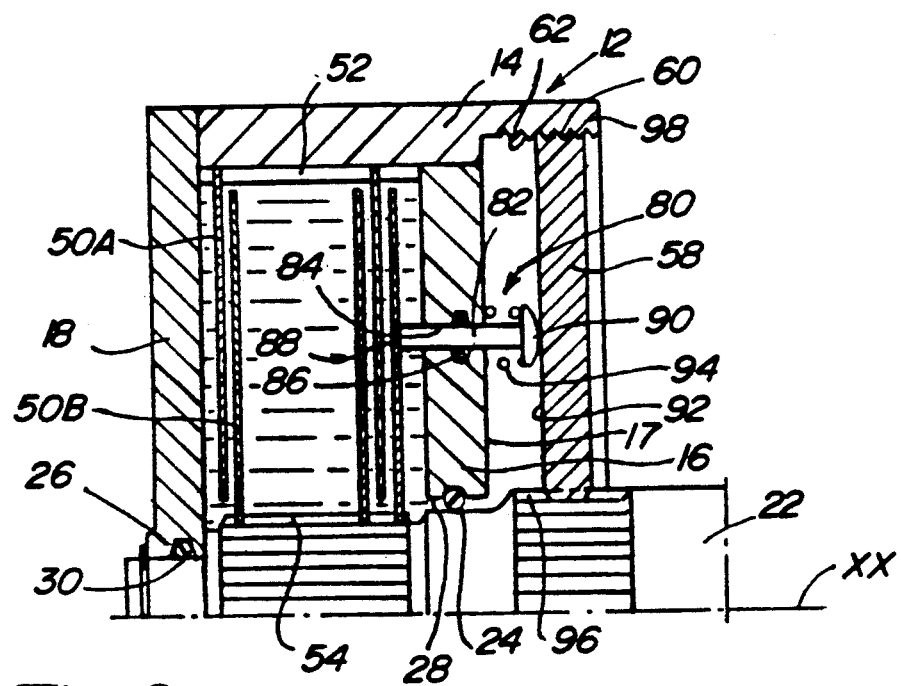
FIG. 6 is a diagrammatic half-view in axial section of a fifth alternative embodiment of a shock absorber according to the teachings of the present invention.

The means for varying the law of damping of the shock absorber 10 as a function of the relative angular displacement of the central shaft 22 in relation to the housing 12 consist, in the embodiment of FIG. 6, of a series of active members 80, the axial displacements of which are controlled by a thrust member or axial displacement member 58.

Each of the active members 80 is a piston, the rod 82 of which is received sealingly slidably in an orifice 84 of the lateral flange 16 of the housing 12. The sealing between the orifice 84 and the rod 82 is ensured by means of an O-ring gasket 86.

The free end 88 of the rod 82 is displaced within the inner chamber 20 so as to interact with the opposite disc 58 in order to vary the spacing between the discs 50A and 50B and vary the internal volume of the chamber 20 which is filled at least partially with a viscous fluid.

Each piston 80 has a head 90, the free end face of which interacts with the opposite face 92 of the displacement disc 58.

A helical spring 94 arranged between the opposite face 17 of the flange 16 and the inner face of the head 90 of the piston 80 stresses the latter elastically in the direction corresponding to the emergence of the rod 82 from the chamber 20, in such a way that the head 90 bears permanently against the face 92 of the displacement member 58.

The member 58 is produced in the form of a thicker disc which is mounted slidably at its centre on axial splines 96 of the shaft 22. The outer annular cylindrical edge of the disc 58 has an external thread 60 which is received in a complementary internal thread 62 formed in the inner cylindrical wall of the portion 98 of the shell 14 extending axially beyond the flange 16 to the right, as seen in FIG. 6.

The rotary shock absorber of FIG. 6 operates as follows.

If the central shaft 22 is driven in rotation relative to the housing 12 in a first direction of rotation, it drives in rotation the discs 50B between the discs 50A and produces a conventional effect of shearing the viscous fluid which generates a rotation-braking effect. The same rotation of the shaft 22 drives the axial displacement disc 58 in rotation by means of the splines 96 and therefore brings about its axial displacement relative to the shaft 22 and to the housing 12 as a result of the interaction between the external thread 60 and the internal thread 62. Depending on the direction of the threading, the rotation in the first direction, for example clockwise, of the shaft 22 causes the axial displacement of the disc 58 in the direction corresponding to the compression of the discs 50A and 50B by the ends 88 of the rods 82 of the pistons 80, that is to say to the left, as seen in FIG. 6.

The effect of this axial displacement is, therefore, to reduce the spacing between the discs 50A and 50B and therefore to vary the law of damping resulting from the creation of laminar flow in the viscous fluid as a function of the angular rotational displacement of the shaft 22 in relation to the housing 12.

The displacement of the rods 82 in the inner chamber 20 also makes it possible to vary the internal pressure within the inner chamber 20 as a result of the reduction of the volume available for the viscous fluid contained in the latter.

It will easily be appreciated that the rotation of the shaft 22 relative to the housing 12 in the opposite direction, for example in the anti-clockwise direction, causes the displacement of the disc 58 in the opposite axial direction corresponding to a mutual movement away of the discs 50A and 50B and therefore providing a different law of damping, the inner volume of the chamber 20 once again increasing as a result of the emergence of the rods 82 from the chamber 20 under the action of the return springs 94.

The alternative embodiment illustrated in FIG. 7 will now be described.

Here, the active members 80 consist of rods 82, the ends 88 of which penetrate into orifices 84 of the lateral flange 16 in the same way as the rods 82 of the pistons 80 of the preceding embodiment.

The opposite free ends 89 of the rods 82 are fastened in corresponding bores 100 formed in the axial displacement disc 58.

The axial and rotational immobilisation of the rods 82 relative to the disc 58 ensures that the latter is immobilised in terms of rotation in relation to the housing 12.

The axial displacement disc 58 has a central hole, in which is formed an internal thread 62 interacting with an external thread 60 formed on the shaft 22.

Figure 7:
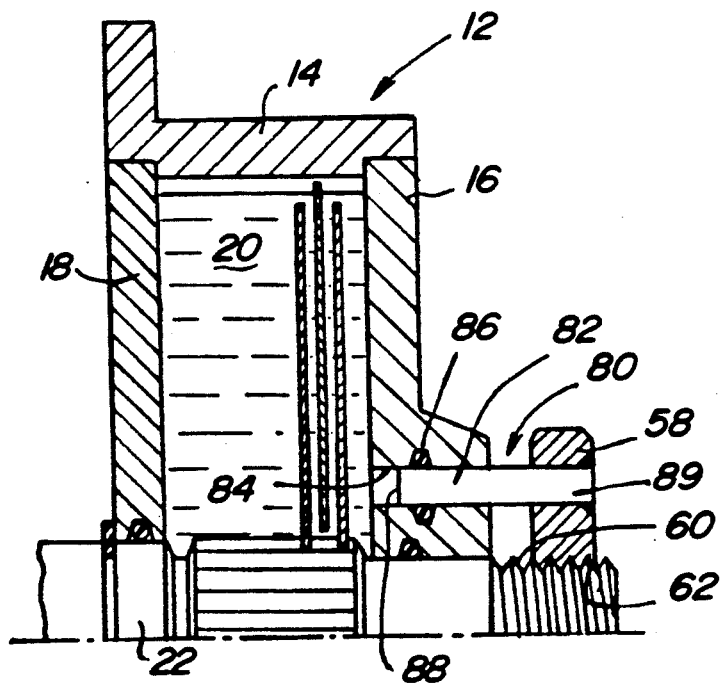
FIG. 7 is a view, similar to that of FIG. 6, of a sixth alternative embodiment of the rotary shock absorber.

The rotary shock absorber shown in FIG. 7 operates in a way similar to that of the shock absorber illustrated in FIG. 6, the axial displacement of the member 58 and the resulting displacement of the rods 82 bringing about a variation of pressure within in the housing.

The orifices 84 provided in the lateral flange 16 can serve for the filling and emptying of the inner chamber 20.

The invention is not limited to its use on the suspensions of motor vehicles, and other uses can be considered for this type of shock absorber, such as, for example, in the devices known as "dampers".

In the two embodiments, the orifices 84 are preferably uniformly distributed angularly on the same circle about the axis X—X.

I claim:

1. A rotary shock absorber (10) of the type comprising a sealed hollow cylindrical housing (12), in which are arranged sicks (50A, 50B) alternately integral in terms of rotation with the housing (12) or with a coaxial central shaft (22) mounted rotatably in the housing (12), the inner chamber (20) delimited by the housing (12) being filled at least partially with a viscous fluid received between the mutually confronting faces of the disks, wherein there are means for varying the law of damping of the shock absorber as a function of the relative angular displacement of the central shaft (22) in relation to the housing (12).

2. The rotary shock absorber as claimed in claim 1, wherein the means (58) for varying the law of damping act to vary the spacing between the mutually confronting faces of the disks (50A, 50B).

3. The rotary shock absorber as claimed in claim 2, further comprising means for varying the spacing between the mutually confronting faces of the disks comprise a member (58) for the axial displacement of the disks, arranged within the housing (12), and means (60, 62, 64, 76) for converting said relative angular displacement into an axial displacement of the member (58) for the displacement of the disks.

4. The shock absorber as claimed in claim 3, wherein the displacement member (58) is integral in terms of rotation with one of the two elements consisting of the housing (12) and the central shaft (22) and capable of being displaced axially relative to one of these two elements, and wherein it is connected to the other of said two elements (22, 12) as a result of an interaction of shapes (60, 62, 74, 76) provided respectively on the displacement member (58) and on the other of the two elements and converting said relative angular displacement into an axial displacement of the displacement member within said chamber (20).

5. The shock absorber as claimed in claim 4, wherein said interacting shapes comprise an external thread (60) and a complementary internal thread (62) which are formed respectively on the displacement member (58) or the other (22) of said two elements.

6. The shock absorber as claimed in claim 4, wherein said interacting shapes comprise a circular camtrack (74) connected in terms of rotation to the displacement member (58) or to said other element and a cam follower element (76) connected in terms of rotation to said other element or to said member.

7. The shock absorber as claimed in any one of claims 1 to 3, wherein the means for varying the law of damping act to vary the fluid pressure in said chamber (20).

8. The shock absorber as claimed in claim 3, wherein the displacement member comprises a portion (68) which extends outside the housing (12) so as to vary the volume of the part of the displacement member received in said chamber (20) as a function of the axial position of said member (58) in relation to the housing (12), in order thereby to vary the internal pressure of the fluid in said chamber (20).

9. The shock absorber as claimed in claim 8, wherein said variation in volume is an increase in the latter when the displacement member (58) is displaced axially relative to the housing (12) in the direction corresponding to a reduction of said spacing between the mutually confronting faces of the disks.

10. The shock absorber as claimed in claim 8, wherein said variation in volume is a reduction in the latter when the displacement member (58) is displaced axially relative to the housing (12) in the direction corresponding to a reduction of said spacing between the mutually confronting faces of the disks.

11. The shock absorber as claimed in claim 1, wherein the disks are mounted axially slidably relative to the housing (12) and to the central shaft (22).

12. The shock absorber as claimed in claim 1, wherein the mutually confronting faces of the disks have a fictional covering.

13. The shock absorber as claimed in claim 1, wherein the mutually confronting faces of the disks are capable of coming into mutual contact.

14. The rotary shock absorber (10) as claimed in claim 1, wherein there is an active member (80) which is arranged outside the housing and part (82) of which extends axially inside the housing through an orifice (84) made in a lateral flange (16) of the housing, in which it is received axially slidably, and a member (58) for the axial displacement of the active member (80) in relation to the housing (12), the displacements of which are controlled by means (60, 62) for converting said relative angular displacement into an axial displacement of the member for the displacement of the disks.

15. The rotary shock absorber as claimed in claim 14, wherein the displacement member (58) is integral in terms of rotation with one of the two elements consisting of the housing (12) and the central shaft (22) and is capable of being displaced axially relative to one of these two elements, and wherein it is connected to the other of said two elements as a result of an interaction of shapes (60, 62) provided respectively on the displacement member (58) and on the other of the two elements and converting said relative angular displacement into an axial displacement of the displacement member.

16. The shock absorber as claimed in claim 15, wherein said interacting shapes comprise an external thread (60) and a complementary internal thread (62) which are formed on the displacement member (58) or the other of said two elements (12, 22).

17. The rotary shock absorber as claimed in claim 14, wherein the active member (80) is a piston, of which the rod (82) is received in said orifice (84) and of which the head (90) arranged outside the housing (12) interacts with said axial displacement member (58).

18. The rotary shock absorber as claimed in claim 17, wherein said axial displacement member (58) is a disk, of which the face (92) confronting the housing interacts with the opposite face of the head (90) of said piston (80).

19. The rotary shock absorber as claimed in claim 17, wherein means (94) for the elastic return of the piston in the direction corresponding to the emergence of the rod (82) from the housing (12) are arranged between the piston head (90) and the opposite face (17) of the lateral flange (16) of the housing.

20. The rotary shock absorber as claimed in claim 14, wherein the active member (80) is a rod (82) which is received in said orifice (84) and of which the free end (89) arranged outside the housing is fastened to said axial displacement member (58).

21. The rotary shock absorber as claimed in claim 17, wherein the external thread (60) is formed on the displacement member (58), and wherein the complementary internal thread (62) is formed in the housing.

22. The rotary shock absorber as claimed in claim 20 taken in combination with claim 16, wherein said external thread (60) is formed on the central shaft (22), and wherein the complementary internal thread (62) is formed on the axial displacement member.

23. The shock absorber as claimed in claim 14, wherein sealing means (86) are arranged in the wall of said orifice (84) so as to in interact with the opposite surface of the active member (80).

24. The shock absorber as claimed in claim 14, wherein the part (88) of the active member (80) which extends inside the housing interacts with the opposite disk.

* * * * *